United States Patent
Kadomatsu et al.

(10) Patent No.: US 11,394,919 B2
(45) Date of Patent: Jul. 19, 2022

(54) IMAGE PROCESSING APPARATUS, IMAGE PROCESSING METHOD AND MEDIUM

(71) Applicant: CANON KABUSHIKI KAISHA, Tokyo (JP)

(72) Inventors: Daiki Kadomatsu, Kawasaki (JP); Kosei Tanaka, Kawasaki (JP); Gou Sasaki, Kawasaki (JP); Hirokazu Kameda, Kamakura (JP); Chisei Sumita, Tokyo (JP); Takeshi Nakamura, Fuchu (JP); Ken Hoshino, Yokohama (JP); Hiroaki Hasegawa, Yokohama (JP); Kenichi Yoshida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/916,269

(22) Filed: Jun. 30, 2020

(65) Prior Publication Data

US 2021/0006747 A1 Jan. 7, 2021

(30) Foreign Application Priority Data

Jul. 2, 2019 (JP) .............................. JP2019-123748

(51) Int. Cl.
*H04N 5/93* (2006.01)
*G11B 27/036* (2006.01)
*G10L 15/26* (2006.01)
*G10L 25/57* (2013.01)
*G06V 20/40* (2022.01)

(52) U.S. Cl.
CPC ........... *H04N 5/9305* (2013.01); *G06V 20/41* (2022.01); *G10L 15/26* (2013.01); *G10L 25/57* (2013.01); *G11B 27/036* (2013.01)

(58) Field of Classification Search
None
See application file for complete search history.

(56) References Cited

U.S. PATENT DOCUMENTS 8,416,332 B2  4/2013  Sato et al.
9,646,631 B2  5/2017  Kitazawa
(Continued)

FOREIGN PATENT DOCUMENTS

JP   2010-191934 A   9/2010
JP   2015-138053 A   7/2015
(Continued)

*Primary Examiner* — Heather R Jones
(74) *Attorney, Agent, or Firm* — Venable LLP

(57) ABSTRACT

An object of one embodiment of the present disclosure is to provide a product with a high added value to a user by preventing an erroneous character string from being combined in a case where a voice before and after an image selected from within a moving image is a mixed voice. One embodiment of the present disclosure is an image processing apparatus including: a selection unit configured to select, from a moving image including a plurality of frames, a part of the moving image; an extraction unit configured to extract a voice during a predetermined time corresponding to the selected part in the moving image; and a combination unit configured to combine a character string based on a voice extracted by the extraction unit, with the part of the moving image selected by the selection unit or a frame among frames corresponding to the part.

21 Claims, 8 Drawing Sheets

(56) References Cited

U.S. PATENT DOCUMENTS

| | | | | |
|---|---|---|---|---|
| 2010/0182501 A1* | 7/2010 | Sato | ................ | G06F 16/739 |
| | | | | 348/441 |
| 2011/0317984 A1* | 12/2011 | Masutani | ............ | H04N 9/8205 |
| | | | | 386/285 |
| 2013/0028571 A1* | 1/2013 | Sato | ................ | H04N 5/76 |
| | | | | 386/230 |
| 2013/0086458 A1* | 4/2013 | Kurata | ............... | G06T 11/60 |
| | | | | 715/202 |
| 2015/0205575 A1 | 7/2015 | Kitazawa | | |
| 2016/0292898 A1* | 10/2016 | Ooshima | ............... | G06T 11/60 |
| 2019/0132491 A1* | 5/2019 | Stenger | ............... | H04N 21/242 |

FOREIGN PATENT DOCUMENTS

| | | |
|---|---|---|
| JP | 2017-059245 A | 3/2017 |
| JP | 2017-117407 A | 6/2017 |

\* cited by examiner

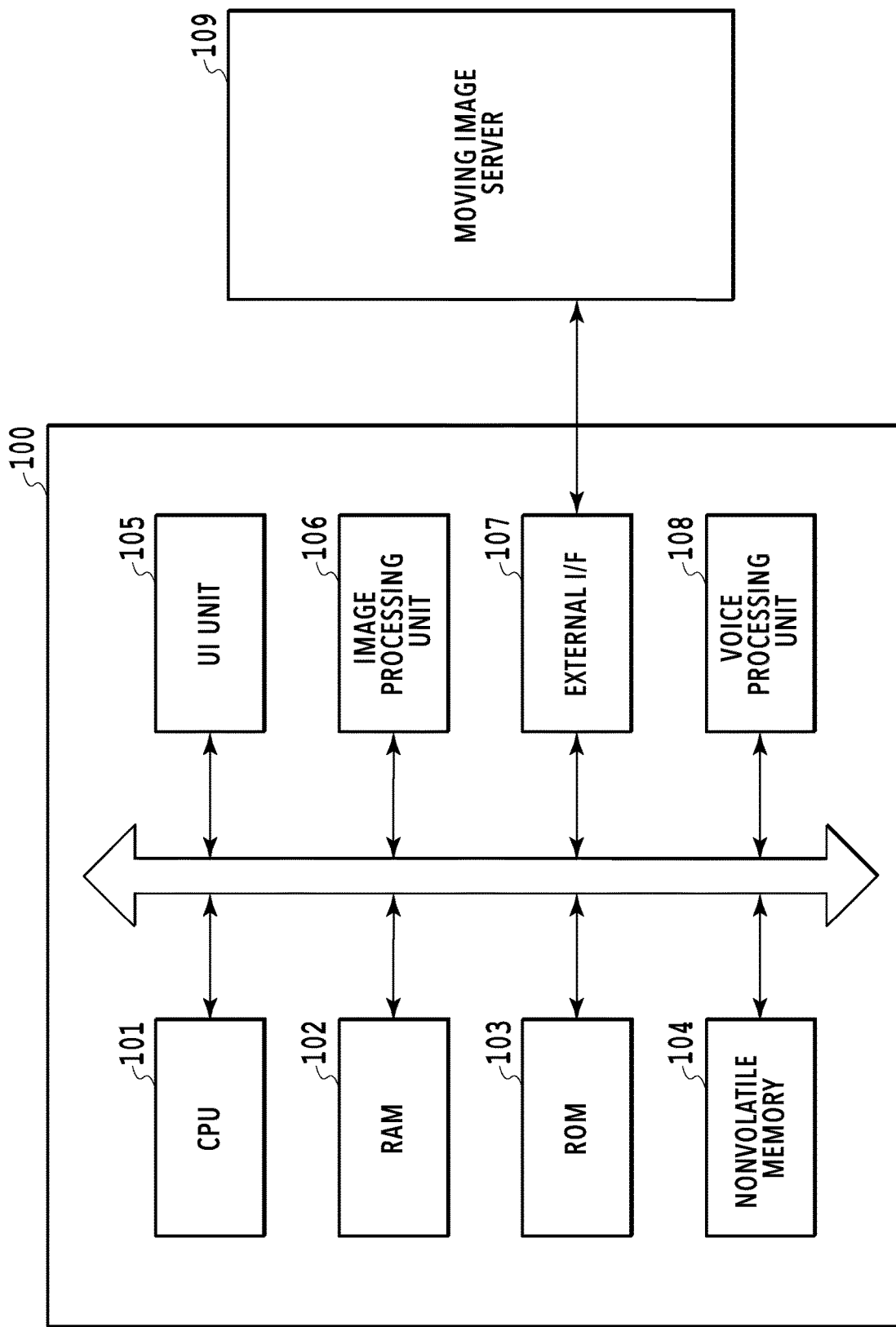

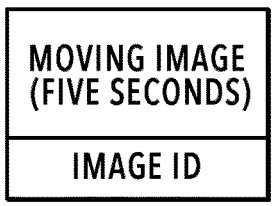
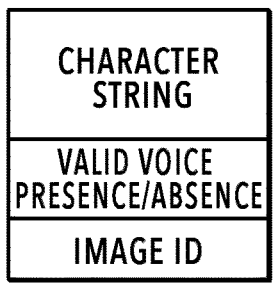
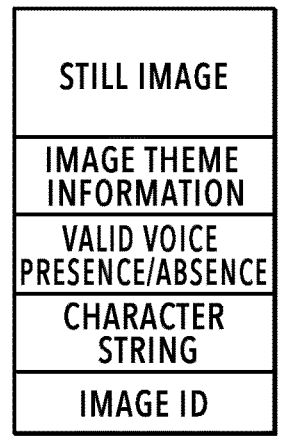
FIG.4A  FIG.4B  FIG.4C  FIG.4D
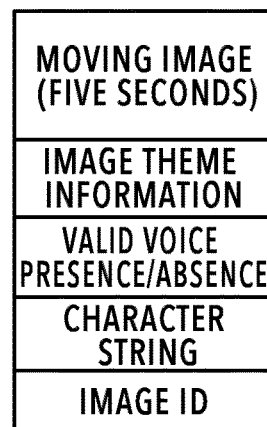
FIG.4E  FIG.4F
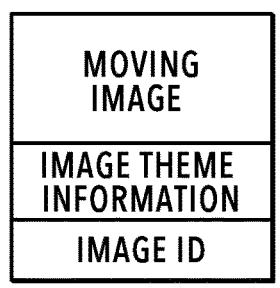
FIG.4G  FIG.4H

IMAGE PROCESSING APPARATUS, IMAGE PROCESSING METHOD AND MEDIUM

BACKGROUND OF THE INVENTION

Field of the Invention

The present application relates to a technique to create an image by combining a character with a still image.

Description of the Related Art

The technique to create an image by combining a character string with a still image or a moving image is known generally. Further, as moving images spread in recent years, an image processing method is also proposed, which creates an image by extracting a still image corresponding to one frame from within a moving image, converting a voice within the moving image into a character string, and combining the character string with the still image.

Japanese Patent Laid-Open No. 2010-191934 has disclosed a technique to lay out an image into a comic-like image, which is obtained by extracting an image and a voice from within a moving image, converting the extracted voice into a character string, and combining the obtained character string.

SUMMARY OF THE INVENTION

However, there is a case where the voice within the moving image is a mixed voice mixed with an environmental sound or voices of a plurality of speakers. At this time, in a case where a character string corresponding to the voice is combined as described in Japanese Patent Laid-Open No. 2010-191934, it is considered that a character string having no meaning for a user is combined.

Consequently, in view of the above-described problem, an object of one embodiment of the present disclosure is to provide a technique to enable a use of an appropriate character string for combination in a case where the voice before or after an image selected from within a moving image is a mixed voice.

Consequently, one embodiment of the present disclosure is an image processing apparatus including: a selection unit configured to select, from a moving image including a plurality of frames, a part of the moving image; an extraction unit configured to extract a voice during a predetermined time corresponding to the selected part in the moving image; and a combination unit configured to combine a character string based on a voice extracted by the extraction unit, with the part of the moving image selected by the selection unit or a frame among frames corresponding to the part, wherein based on that a voice extracted by the extraction unit satisfies a predetermined condition corresponding to a mixed voice, the combination unit combines a character string prepared in advance with the selected part or the frame.

Further features of the present invention will become apparent from the following description of exemplary embodiments with reference to the attached drawings.

BRIEF DESCRIPTION OF THE DRAWINGS

FIG. 1 is a block diagram showing a hardware configuration of an image processing apparatus;

FIG. 4A to FIG. 4H are each a conceptual diagram for explaining a data format;

DESCRIPTION OF THE EMBODIMENTS

First Embodiment

<General Explanation of Image Processing Apparatus>

Figure 2A:
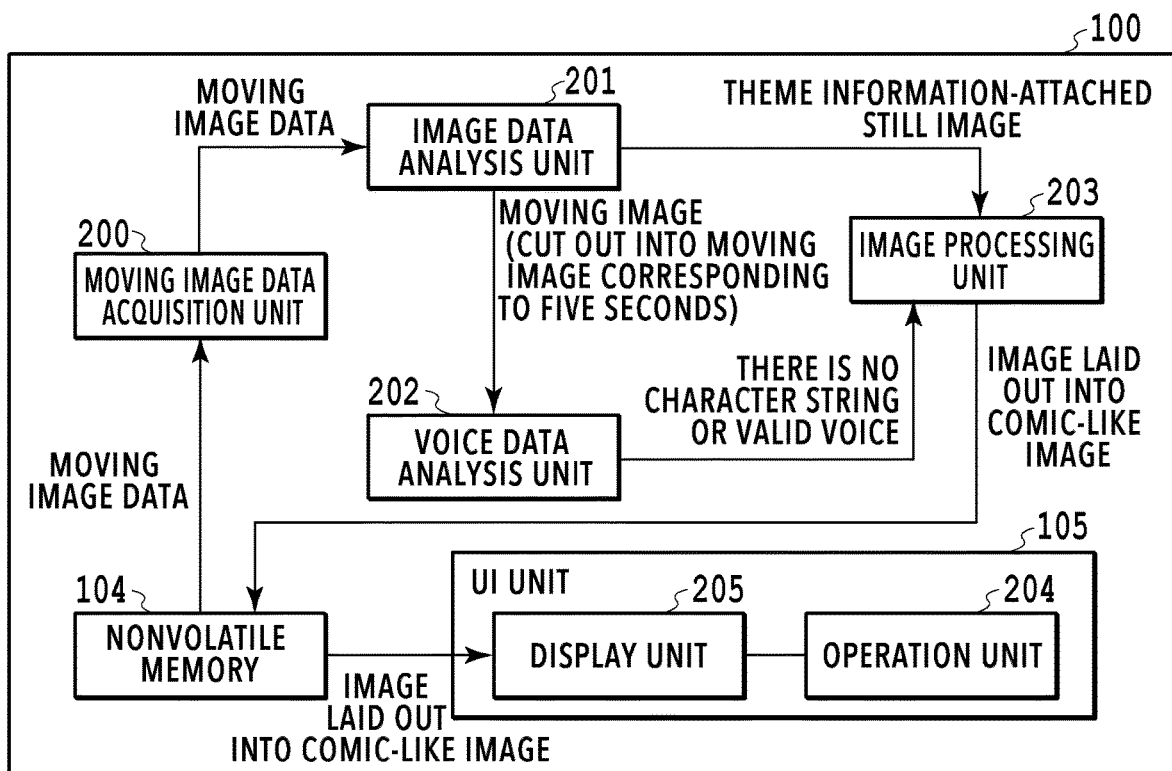
FIG. 2A and FIG. 2B are each a block diagram showing a data flow within the image processing apparatus.

FIG. 1 is a block diagram showing the hardware configuration of an image processing apparatus 100 in the present embodiment. A CPU 101 performs various kinds of control, such as image processing control, by loading control programs stored in a ROM 103 onto a RAM 102 and reading the control programs as needed. The RAM 102 is a main storage device of the CPU 101 and used as a work area or a temporary storage area for loading various programs stored in the ROM 103. In the ROM 103, various programs, such as a boot program of the image processing apparatus 100, are stored. In the present embodiment, a flash storage or the like is supposed as the ROM 103, but it may also be possible to adopt an auxiliary storage device, such as a hard disk. In a nonvolatile memory 104, moving image data received from a moving image server 109, character string data, to be described later, and image layout data are stored. A user interface unit (hereinafter, UI unit) 105 includes a liquid crystal display unit having a touch panel function, an operation key, and the like, and functions as a reception unit configured to receive instructions of a user. An image processing unit 106 is a GPU that performs acquisition and analysis of moving image data, image correction, and image processing. An external interface (hereinafter, external I/F) 107 has a USB I/F and a network I/F and is connected with an external server, an external storage, and the like. A voice processing unit 108 performs analysis of voice data, control to derive a voice amount from a voice waveform, and so on. In the external moving image server 109, moving image data is stored and the image processing apparatus 100 temporarily stores the moving image data received from the moving image server 109 in the nonvolatile memory 104 within the apparatus through the external I/F 107 and performs processing for the moving image data.

The data flow in the image processing apparatus 100 of the present embodiment is explained by using FIG. 2A and the like. FIG. 2A is a block diagram showing the functional configuration and a data flow between modules of the image processing apparatus 100 in the present embodiment. In a case where a user inputs a theme and a layout of a comic to be created and moving image data via an operation unit 204, and the CPU 101 of the image processing apparatus 100 receives the user input, processing to convert an image into a comic-like image is started. In a case where a theme and a layout of a comic are determined, the number of frames to be crated is determined naturally.

Figure 3A:
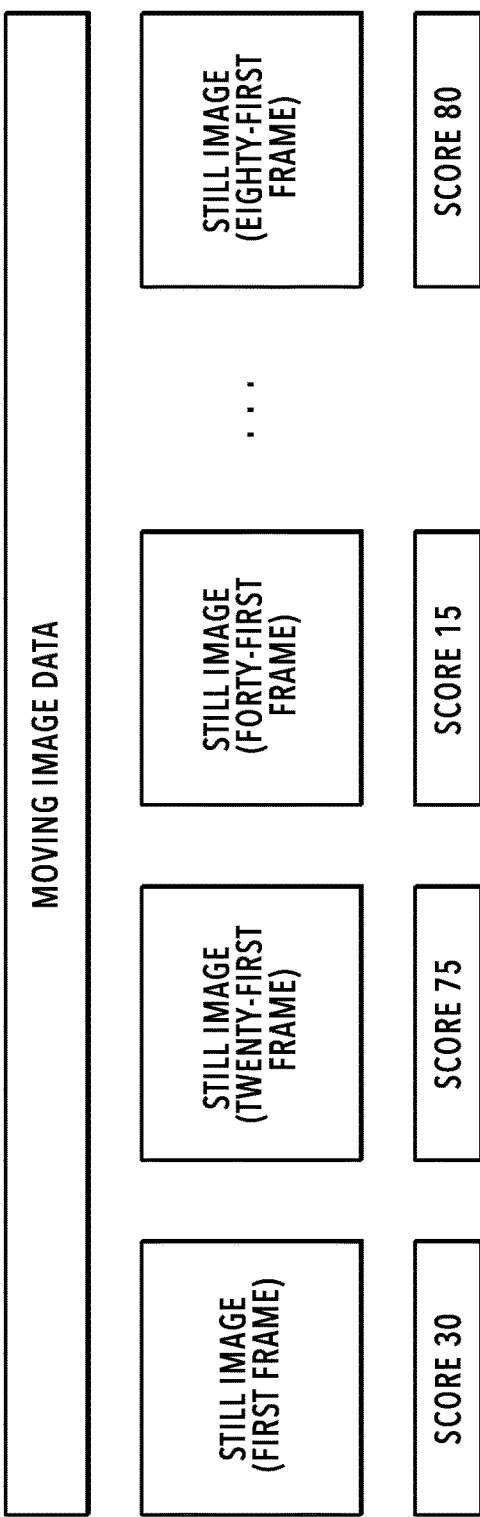
FIG. 3A and FIG. 3B are each a conceptual diagram for explaining handling of moving image data.

In a case where the processing to convert an image into a comic-like image is started with the operation to the operation unit 204 by a user as a trigger, a moving image data acquisition unit 200 acquires moving image data from the nonvolatile memory 104 and transmits the acquired moving image data to an image data analysis unit 201. The image data analysis unit 201 receives the moving image data from the moving image data acquisition unit 200 and divides the moving image into still images at intervals of a certain number of frames, for example, still images at intervals of 20 frames as in FIG. 3A, and then, gives a score to each still image by performing data analysis for each of the divided still images. Such giving a score to each still image is called "scoring" and can be implemented by, for example, a method as disclosed in Japanese Patent Laid-Open No. 2017-117407.

Figure 3B:
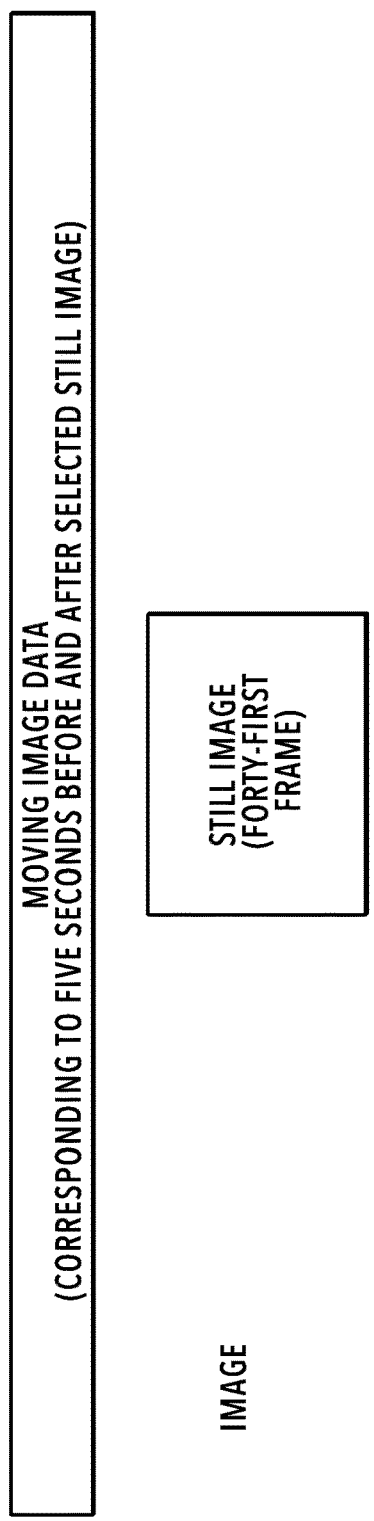

The image data analysis unit 201 transmits moving image data on scored still images, which corresponds to, for example, a predetermined time (in the present embodiment, five seconds before or after, or both before and after still image of interest) before or after (or both before and after) a still image of interest as a base point as shown in FIG. 3B, to a voice data analysis unit 202 along with an image ID. This transmission of the moving image data is performed in order from the moving image data in which the still image whose score is high is included. Further, the image data analysis unit 201 transmits each piece of data on the scored still image to an image processing unit 203 along with the image ID. As regards the image ID, it is assumed that the same ID as that of the moving image data to be transmitted to the voice data analysis unit 202 and including the still image is assigned to the data on the still image to be transmitted to the image processing unit 203. The image ID for each still image is assigned in order from the still image whose score is the highest as successive IDs, such as ID1, ID2, ID3, . . . , corresponding to the number of frames. Further, to the still image to be transmitted to the image processing unit 203, theme information indicating a feature derived as a result of analyzing the image is also assigned. That is, the data to be transmitted to the image processing unit 203 is data processed as shown in FIG. 4A and the data to be transmitted to the voice data analysis unit 202 is data processed as shown in FIG. 4B. As the image data analysis method described previously, for example, it is possible to adopt a method described in Japanese Patent Laid-Open No. 2017-59245. Further, the processing described previously, that is, the processing to transmit moving image data to the voice data analysis unit 202 and transmit still image data to the image processing unit 203 is performed the number of times corresponding to the number of frames determined via the operation unit 204.

The voice data analysis unit 202 extracts voice data from the received moving image data. In a case where it is determined that a part of the voice during a sampling period (five seconds in the present embodiment) is a mixed voice for the extracted voice data, the voice data analysis unit 202 regards that there is no valid voice and transmits information indicating that there is no valid voice to the image processing unit 203 along with the image ID. It is possible to implement the determination of whether or not a voice is a mixed voice by, for example, a method of separating a voice component by dynamically generating supervised activity as disclosed in Japanese Patent Laid-Open No. 2015-138053, a method of performing clustering by using a dictionary for which learning has been performed in advance, and the like. In a case where the voice is not a mixed voice during the entire sampling period, the voice data analysis unit 202 performs character string conversion to convert the voice into a character string by performing voice recognition for the extracted voice data. At the time of the character string conversion, while the portion that cannot be recognized as a word or a sentence because the voice of the moving image data (see FIG. 3B) before or after the still image described previously is started from the midway portion of a sentence and the like is deleted, the portion that can be recognized as a word or a sentence is converted into a character string. The converted character string is processed into the format as shown in FIG. 4C along with the image ID. The voice data analysis unit 202 transmits the processed data to the image processing unit 203. Also in a case where there is no character string normally converted during the sampling period as a result of that any portion cannot be recognized as a word or a sentence, the voice data analysis unit 202 transmits information indicating that there is no valid voice to the image processing unit 203 along with the image ID.

The image processing unit 203 receives the data received from the image data analysis unit 201 (that is, the data in the format in FIG. 4A) and the data received from the voice data analysis unit 202 (that is, the data in the format in FIG. 4C). The image processing unit 203 generates the data in the format shown in FIG. 4D by connecting the data in the format in FIG. 4A and the data in the format in FIG. 4C, whose image ID is the same, of the received data. By performing the above processing the number of times corresponding to the number of frames, the data delivered to the image processing unit 203 is temporarily stored in the nonvolatile memory 104 as the data in the format in FIG. 4D, which corresponds to the number of frames, as shown in FIG. 4E.

<About Product>

Figure 5A:
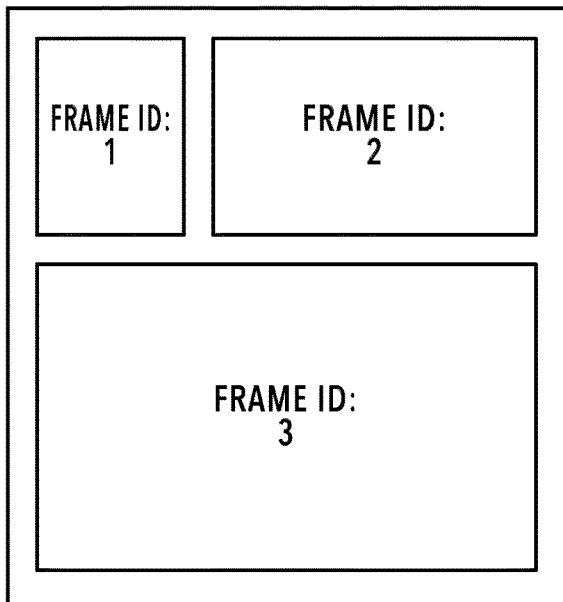
FIG. 5A to FIG. 5C are each an explanatory diagram relating to a product.
Figure 5B:
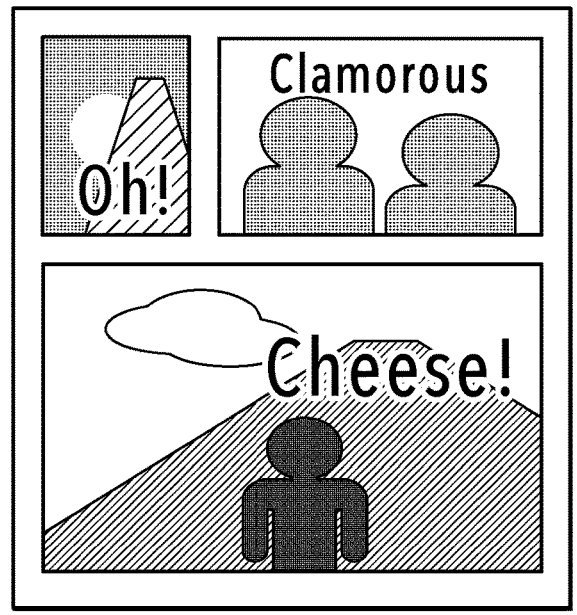

In the following, frame division in the product to be created by the image processing apparatus 100 in the present embodiment and an example of the final product are explained by using FIG. 5A and FIG. 5B. In accordance with the theme of a comic set by a user via the operation unit 204, for example, as shown in FIG. 5A, frame division is performed and further, an ID is determined for each frame. The frame in which an image and a character string are combined in each frame divided as described above is the final product. FIG. 5B shows an example of the final product by the image processing apparatus 100. The final product is used by being displayed on the display unit 205 within the UI unit 105, being printed by a printing apparatus, not shown schematically, and so on.

<About Image Processing>

Figure 6:
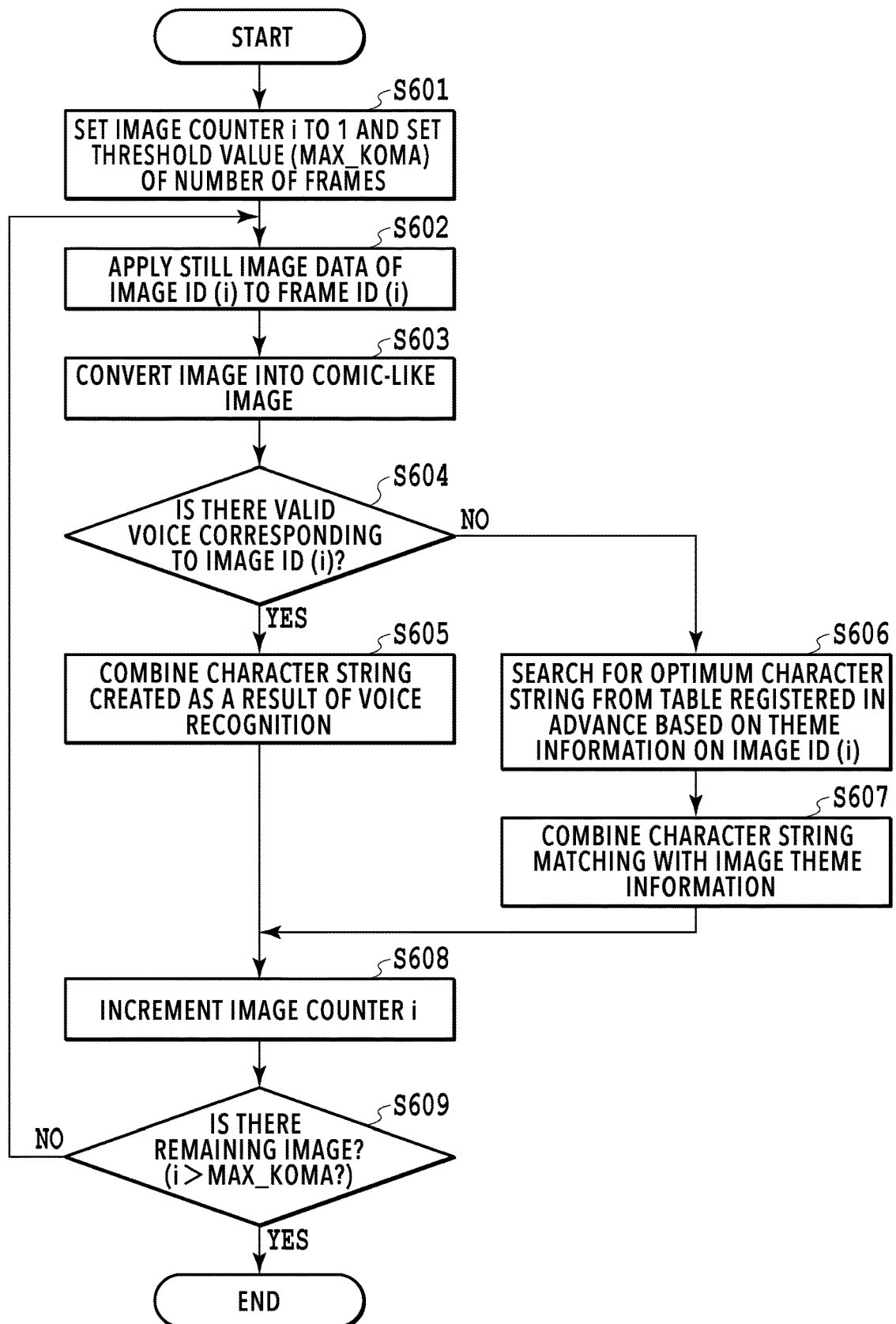
FIG. 6 is a flowchart of image processing in a first embodiment.

In the following, the image processing performed by the image processing unit 203 in the present embodiment is explained by using FIG. 6 and FIG. 8. As the premise that the following processing is started, it is assumed that images corresponding to the number of frames are stored in the format as shown in FIG. 4E in the nonvolatile memory 104.

First, at step S601, the image processing unit 203 performs initialization, Specifically, the value of a variable (referred to as an image counter i) for counting images and frames is set to 1 and at the same time, a constant value (referred to as MAX_KOMA) used as a threshold value of the number of frames is set. In the setting of MAX_KOMA, a value determined in accordance with a user input via the operation unit 204 is used. In the following, "step S-" is abbreviated and simply described as "S-".

At S602, the image processing unit 203 applies the still image of image ID (i) to the ith frame (represented as frame (i)). Here, the image ID (i) is a value stored in the image ID field within the table shown in FIG. 4D. In a case where a still image is applied to a frame, the target still image is resized in accordance with the size of the frame.

At S603, the image processing unit 203 performs image processing for the still image resized at S602 and converts the still image into a comic-like image. "Conversion into a comic-like image" refers to, for example, conversion of a color image into a grayscale image, and the like.

At S604, the image processing unit 203 determines whether there exists a valid voice corresponding to the ith image (referred to as the image of interest). Specifically, the image processing unit 203 reads the value stored in a valid voice presence/absence field corresponding to the image ID (i) in the table shown in FIG. 4E and determines whether the read value is a value indicating that a valid voice exists. In a case where determination results at this step are affirmative, the processing advances to S605 and on the other hand, in a case where the determination results are negative, the processing advances to S606.

In a case where the valid voice corresponding to the image of interest exists (YES at S604), at S605, the image processing unit 203 rasterizes the character string stored in the character string field (see FIG. 4E). Then, the image processing unit 203 combines the bitmap image obtained as a result of rasterization with the still image converted into a comic-like image at S603.

In a case where the valid voice corresponding to the image of interest does not exist (NO at S604), at S606, the image processing unit 203 reads the value of the theme information corresponding to the image ID (i) and searches for the character string suitable to this value from a table prepared in advance in the nonvolatile memory 104. The table stored in the nonvolatile memory 104 described previously has a configuration as illustrated in FIG. 8.

Figure 8:
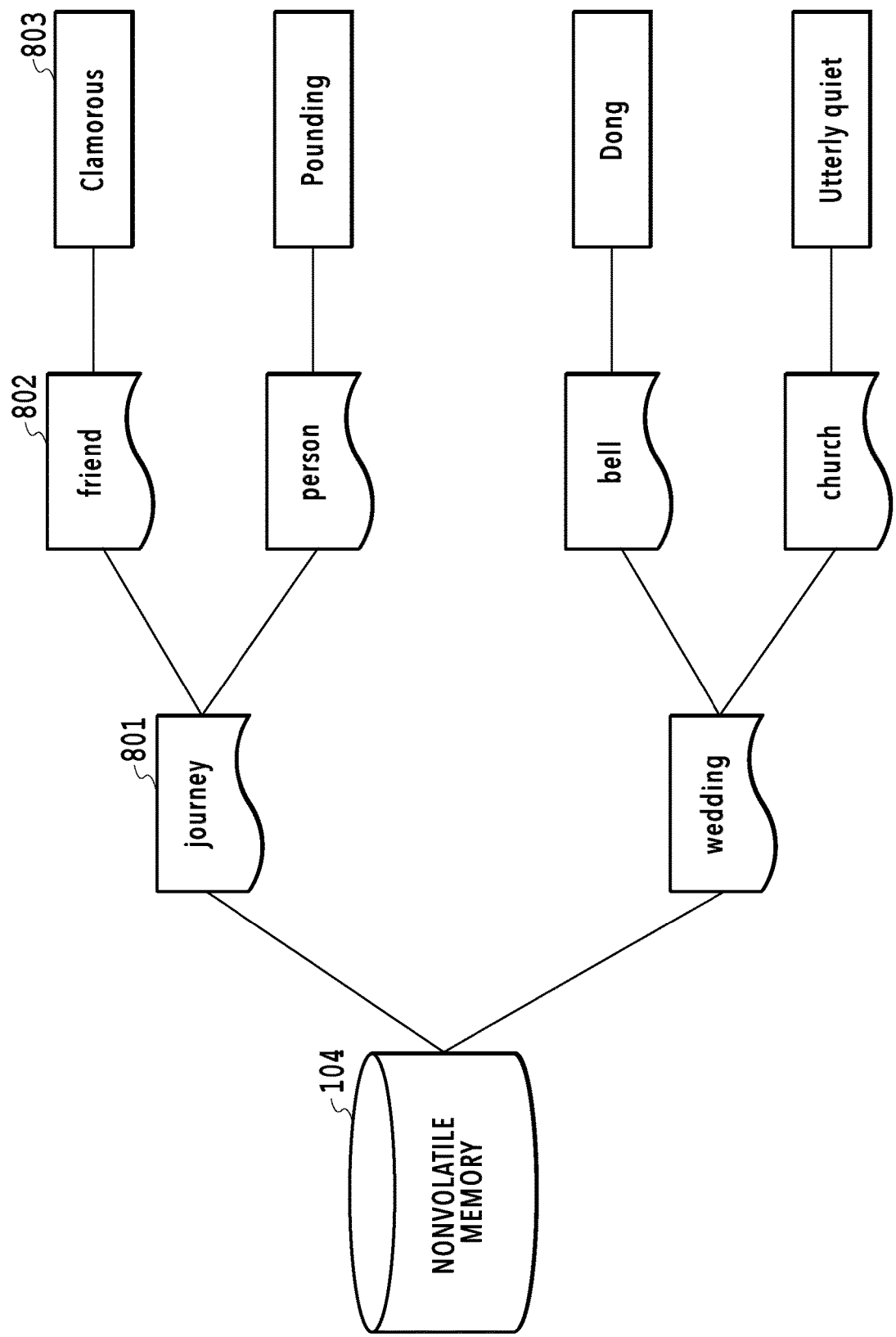
FIG. 8 is an example of a table used at the time of converting a voice into a character string.

As indicated by symbol 801 in FIG. 8, in the first hierarchy, classification according to theme information on a comic, which may be selected by the operation unit 204, has been performed in advance. For example, in a case where it is assumed that the theme is set to "journey", in the classification of journey among the classifications located in the first hierarchy, the keyword that matches with the theme information corresponding to the image of interest is searched for from the second hierarchy. The value of the theme information corresponding to the image of interest is stored in the theme information field of the image within the table shown in FIG. 4E, and therefore, this is made use of. In a case where the value "friend" is stored in the theme information field of the image of interest, friend 802 located in the second hierarchy matches with this value, and therefore, it is possible to acquire a character string 803 in the third hierarchy associated with friend 802. The character string acquired at S606 is rasterized at S607 as in the processing performed at S605 and combined with a still image as a bitmap image.

At S608, the image processing unit 203 increments the image counter i.

At S609, the image processing unit 203 determines whether the processing is performed the number of times corresponding to the number of frames (whether there is no unprocessed image). Specifically, the image processing unit 203 determines whether the value of the image counter i is greater than the value of MAX_KOMA. In a case where determination results at this step are affirmative, it is regarded that the processing is performed the number of times corresponding to the number of frames and the series of processing is terminated. In a case where the determination results at this step are negative, the processing returns to S602.

As explained above, according to the present embodiment, in a case where the voice before or after a still image selected from within a moving image is a mixed voice or it is not possible to determine the voice, an unnatural character string is prevented from being combined and it is made possible to provide a product with an added value higher than that of the prior art to a user.

Second Embodiment

<About Configuration of Image Processing Apparatus>

Figure 2B:
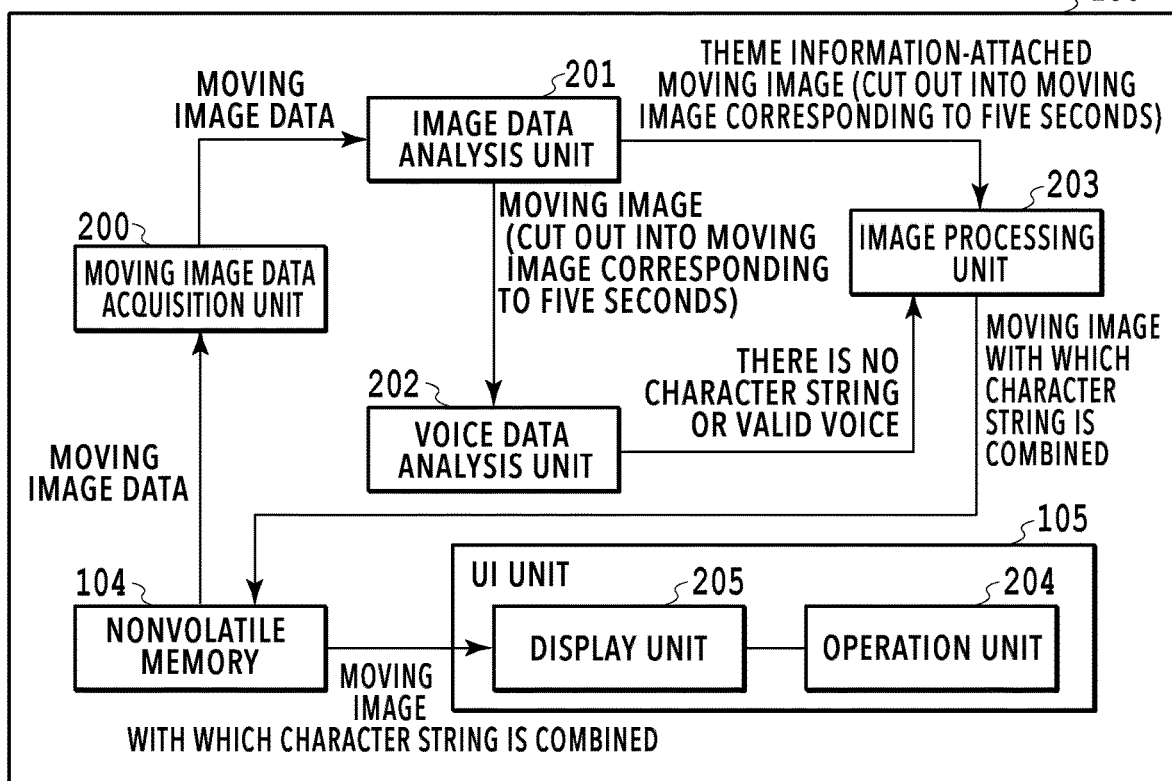

In the following, the configuration of the image processing apparatus in the present embodiment is explained by using FIG. 2B. FIG. 2B shows a block diagram showing the functional configuration and a data flow between modules of the image processing apparatus in the present embodiment. In the following, differences from the already-described embodiment are explained mainly and explanation of the same elements as those of the already-described embodiment is omitted appropriately by attaching the same symbols.

In a case where a user inputs a theme of a moving image to be created and moving image data via the operation unit 204, and the CPU 101 of the image processing apparatus 100 receives the user input, creation of a moving image in which a character string is combined is started.

In a case where the creation of a combined moving image is started with the operation to the operation unit 204 by a user as a trigger, the moving image data acquisition unit 200 acquires moving image data from the nonvolatile memory 104 and transmits the acquired moving image data to the image data analysis unit 201. The image data analysis unit 201 receives the moving image data from the moving image data acquisition unit 200 and divides the moving image into moving images each corresponding to a predetermined time, for example, five seconds, and transmits the divided moving image to the voice data analysis unit 202. Further, the image data analysis unit 201 further divides the divided moving image corresponding to the predetermined time into still images at intervals of a certain number of frames, for example, still images at intervals of 20 frames as in FIG. 3A, and then, scores each still image by performing data analysis for each of the divided still images. Then, the image data analysis unit 201 performs feature analysis of the still image whose score is the highest among the scored still images and determines the theme of the image. Then, the image data analysis unit 201 assigns information on the determined theme to the moving image data divided into moving image data corresponding to the predetermined time (five seconds in this example) described previously and transmits the moving image data to the image processing unit 203. That is, the data that is transmitted to the image processing unit 203 is data processed as shown in FIG. 4G and the data that is transmitted to the voice data analysis unit 202 is data processed as shown in FIG. 4B. As the method of analyzing the feature of a still image and determining the theme of an image, which is described previously, for example, it is possible to adopt the method described in Japanese Patent Laid-Open No. 2017-59245. Further, the processing described previously, that is, the processing to transmit the moving image data to the voice data analysis unit 202 and transmit the theme information-attached moving image data to the image processing unit 203 is performed repeatedly the number of times corresponding to the total time of the moving image data, for example, in a case where the moving image data corresponds to 60 seconds, the processing is performed repeatedly 12 times in units of five seconds.

The voice data analysis unit 202 extracts voice data from the received moving image data. In a case where it is determined that at least a part of the voice during the sampling period (during five seconds in the present embodiment) is a mixed voice, the voice data analysis unit 202 regards that there is no valid voice and transmits information indicating that there is no valid voice to the image processing unit 203 along with the image ID. That is, in a case where the voice during the sampling period satisfies a condition corresponding to the characteristic of a mixed voice, the voice is determined to be a mixed voice. As the method of determining whether or not a voice is a mixed voice, for example, it is possible to adopt a method of separating a voice component by dynamically generating supervised activity as disclosed in Japanese Patent Laid-Open No. 2015-138053, a method of performing clustering by using a dictionary for which learning has been performed in advance, and the like. In a case where the voice is not a mixed voice during the sampling period, the voice data analysis unit 202 performs character string conversion to convert the voice into a character string by performing voice recognition for the extracted voice data. At the time of the character string conversion, while the portion that cannot be recognized as a word or a sentence because the voice of the moving image data before or after the still image described previously is started from the midway portion of a sentence and the like is deleted, the portion that can be recognized as a word or a sentence is converted into a character string. The converted character string is processed into the format as shown in FIG. 4C along with the image ID. The voice data analysis unit 202 transmits the processed data to the image processing unit 203.

The image processing unit 203 receives the data received from the image data analysis unit 201 (that is, the data in the format in FIG. 4G) and the data received from the voice data analysis unit 202 (that is, the data in the format in FIG. 4C). The image processing unit 203 generates the data in the format shown in FIG. 4F by connecting the data in the format in FIG. 4G and the data in the format in FIG. 4C, whose image ID is the same, of the received data. By performing the above processing the number of times corresponding to the total time of the moving image data (12 times in the present embodiment), the data delivered to the image processing unit 203 is temporarily stored in the nonvolatile memory 104 as the data in the format in FIG. 4F, which corresponds to 12 times, as shown in FIG. 4H. The temporarily stored data is connected into the moving image corresponding to the original time by the processing of the image processing unit 203, to be described later, and stored in the nonvolatile memory 104.

<About Product>

Figure 5C:
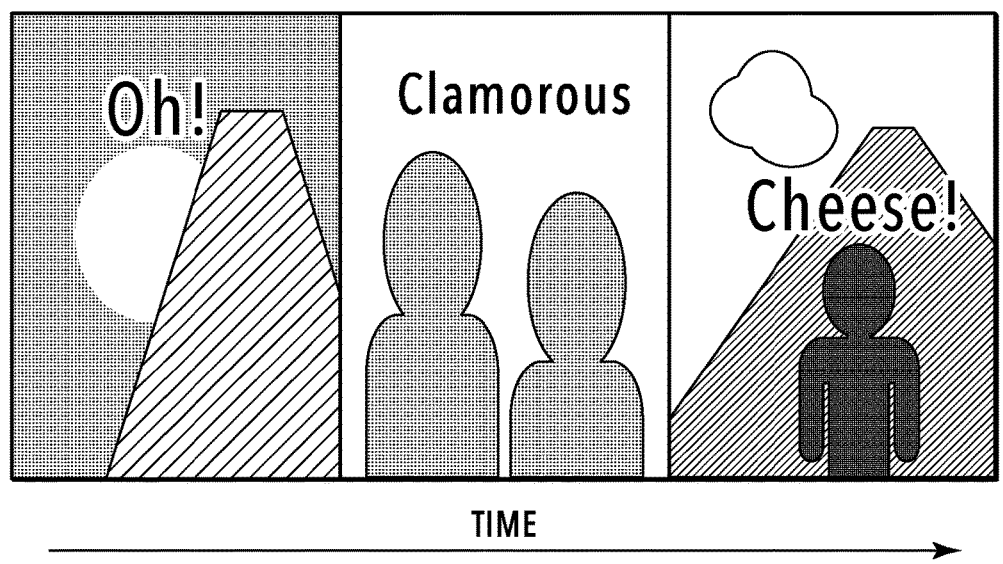

In the following, an example of the final product that is created by the image processing apparatus 100 in the present embodiment is explained by using FIG. 5C. As shown in FIG. 5C, the series of moving images in which a character string is combined with the moving image corresponding to the predetermined time (every five seconds in this example) is the final product. The final product is used by being displayed on the display unit 205 within the UI unit 105, and so on.

<About Image Processing>

Figure 7:
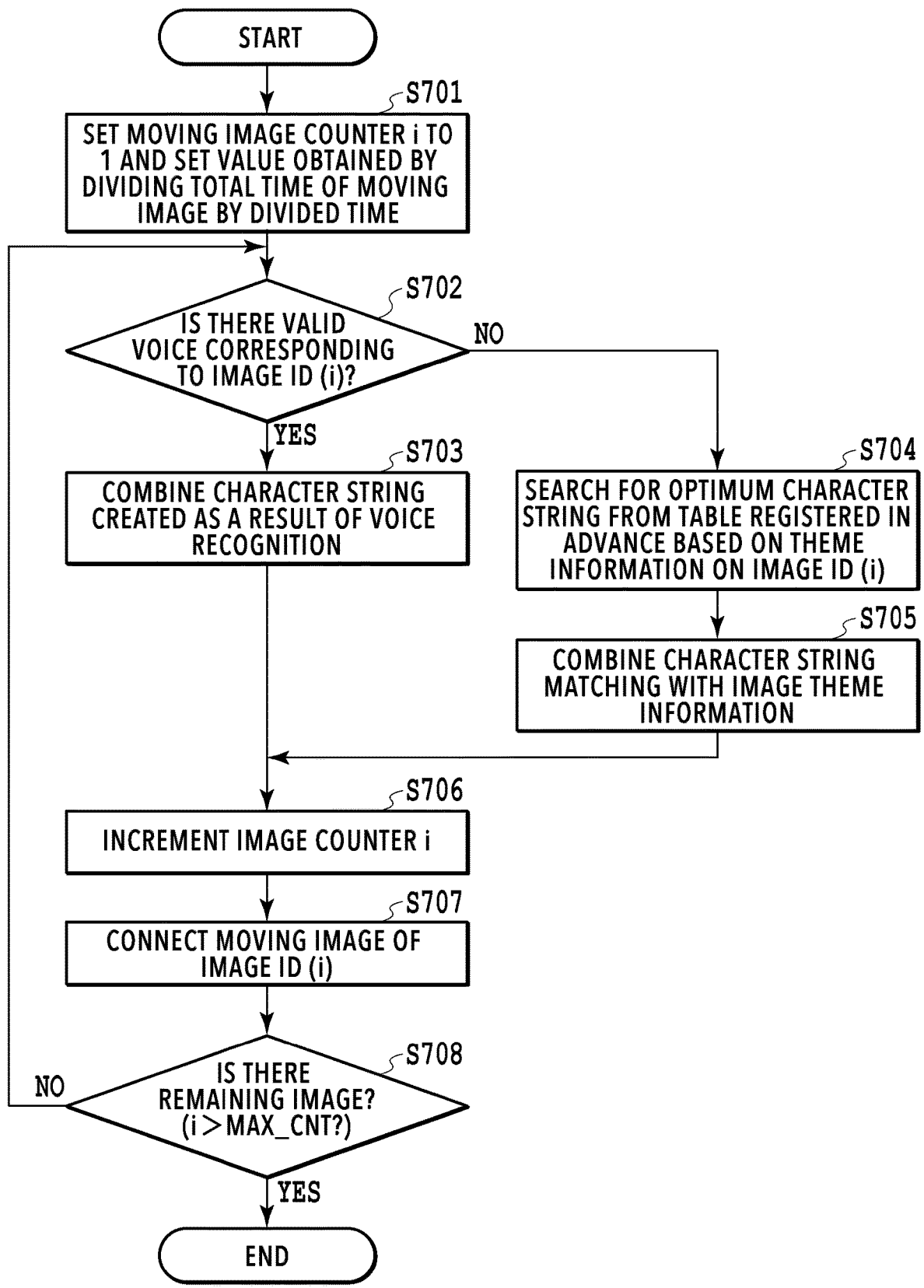
FIG. 7 is a flowchart of image processing in a second embodiment.

In the following, the image processing performed by the image processing unit 203 in the present embodiment is explained by using FIG. 7 and FIG. 8. As the premise that the following processing is started, it is assumed that divided moving images corresponding to the total time of the moving image are stored in the nonvolatile memory 104 in the format as shown in FIG. 4H.

First, at S701, the image processing unit 203 performs initialization. Specifically, the value of a variable (referred to as a moving image counter i) for counting moving images is set to 1 and at the same time, a constant value (referred to as MAX_CNT) used as a threshold value of the number of moving images is set. As the value of MAX_CNT, the value obtained by dividing the total time of the moving image by the time (unit time) of the divided moving image is used.

At S702, the image processing unit 203 reads the value stored in the valid voice presence/absence field corresponding to the image ID (i) in the table shown in FIG. 4H and determines whether the read value is a value indicating that a valid voice exists. In a case where determination results at this step are affirmative, the processing advances to S703 and on the other hand, in a case where the determination results are negative, the processing advances to S704.

In a case where it is determined that a valid voice exists (YES at S702), at S703, the image processing unit 203 rasterizes the character string stored in the character string field (see FIG. 4H). Then, the image processing unit 203 combines the bitmap image obtained as a result of rasterization with the divided moving image of interest (moving image of the image ID (i)).

In a case where it is determined that a valid voice does not exist (NO at S702), at S704, the image processing unit 203 reads the value of the theme information of the image ID (i) and searches for the character string suitable to the read value from the table stored in advance in the nonvolatile memory 104. The table stored in the nonvolatile memory 104 described previously has the configuration as shown in FIG. 8.

The character string acquired at S704 is rasterized at S705 as in the processing performed at S703 and combined with the divided moving image of interest as a bitmap image.

At S706, the image processing unit 203 increments the moving image counter i.

At S707, the image processing unit 203 connects the divided moving image of interest (moving image of the image ID (i)) with which a character string is combined into the moving image obtained by connecting the divided moving images for which the processing at S602 to S609 has been performed so far. The processing at S707 is performed for the purpose of integrating a plurality of divided moving images into one moving image.

At S708, the image processing unit 203 determines whether the processing is performed the number of times corresponding to the total time of the moving image, in other words, determines whether there is an unprocessed divided moving image. Specifically, the image processing unit 203 determines whether the value of the moving image counter i is greater than the value of MAX_CNT. In a case where determination results at this step are affirmative, it is regarded that the processing is performed the number of times corresponding to the total time of the moving image and the series of processing is terminated. On the other hand, in a case where the determination results at this step are negative, the processing returns to S702.

As explained above, according to the present embodiment, it is made possible to provide a product with an added value higher than that of the prior art to a user by preventing an unnatural character string from being combined in a case where the voice before or after a still image selected from within a moving image is a mixed voice or it is not possible to determine the voice.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to one embodiment of the present disclosure, it is possible to use an appropriate character string for combination in a case where a voice before or after an image selected from within a moving image is a mixed voice.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-123748, filed Jul. 2, 2019, which is hereby incorporated by reference herein in its entirety.

What is claimed is:

1. An image processing apparatus comprising:
   a selection unit configured to select, from a moving image including a plurality of frames, a part of the moving image;
   an extraction unit configured to extract a voice during a predetermined time corresponding to the selected part in the moving image;
   a recognition unit configured to recognize a voice extracted by the extraction unit as a word or a sentence, wherein (i) in a case where a voice extracted by the extraction unit is a mixed voice, the recognition unit is not capable of recognizing the voice extracted by the extraction unit as a word or a sentence, and (ii) in a case where a voice extracted by the extraction unit is not a mixed voice, the recognition unit is capable of recognizing the voice extracted by the extraction unit as a word or a sentence;
   a conversion unit configured to convert a word or a sentence recognized by the recognition unit into a character string; and
   a combination unit configured to combine a character string with the part of the moving image selected by the selection unit or a frame among frames corresponding to the part,
   wherein, in accordance with the recognition unit being not capable of recognizing a voice extracted by the extraction unit as a word or a sentence, the combination unit combines, with the selected part or the frame, a character string that is different from a character string obtained by converting a word or a sentence recognized by the recognition unit and is specified based on a feature derived from image analysis of one frame included in the selected part, and
   wherein, in accordance with the recognition unit being capable of recognizing a voice extracted by the extraction unit as a word or a sentence, the combination unit combines, with the selected part or the frame, a character string that is obtained by converting a word or a sentence recognized by the recognition unit and is specified not based on a feature derived from image analysis of one frame included in the selected part.

2. The image processing apparatus according to claim 1, further comprising:
   a determination unit configured to determine, as a feature derived from image analysis of one frame included in the selected part, a theme of the one frame.

3. The image processing apparatus according to claim 2, further comprising:
   a table in which each value of a theme and a character string are associated with each other; and
   a search unit configured to search for a character string corresponding to the theme determined by the determination unit in the table,
   wherein in a case where the recognition unit is not capable of recognizing a voice extracted by the extraction unit as a word or a sentence, the combination unit uses a character string searched by the search unit.

4. The image processing apparatus according to claim 2, wherein any one of a plurality of themes including a wedding and a journey is determined to be a theme of the one frame.

5. The image processing apparatus according to claim 1, wherein the selection unit selects the frame, and selects the part of the moving image based on the selected frame, and
   wherein the extraction unit extracts the voice based on the selected part and the combination unit combines the character string with the selected frame.

6. The image processing apparatus according to claim 5, wherein the selection unit selects a part of the moving image corresponding to the predetermined time before or after the selected frame.

7. The image processing apparatus according to claim 1, wherein the mixed voice is (a) a voice mixed with an environmental sound or (b) voices of a plurality of speakers.

8. An image processing method comprising:
   a selection step of selecting, from a moving image including a plurality of frames, a part of the moving image;
   an extraction step of extracting a voice during a predetermined time corresponding to the selected part in the moving image;
   a recognition step of recognizing a voice extracted in the extraction step as a word or a sentence, wherein (i) in a case where a voice extracted in the extraction step is a mixed voice, the voice extracted at the extraction step is not recognizable as a word or a sentence in the recognition step, and (ii) in a case where a voice extracted in the extraction step is not a mixed voice, the voice extracted at the extraction step is recognizable as a word or a sentence in the recognition step;
   a conversion step of converting a word or a sentence recognized at the recognition step into a character string; and a combination step of combining a character string with the part of the moving image selected at the selection step or a frame among frames corresponding to the part, wherein, in accordance with a voice extracted in the extraction step being not recognizable as a word or a sentence in the recognition step, a character string that is different from a character string obtained by converting a word or a sentence recognized in the recognition step and is specified based on a feature derived from image analysis of one frame included in the selected part is combined with the selected part or the frame in the combination step, and wherein, in accordance with a voice extracted at the extraction step being not recognizable as a word or a sentence in the recognition step, a character string that is obtained by converting a word or a sentence recognized in the recognition step and is specified not based on a feature derived from image analysis of one frame included in the selected part is combined with the selected part or the frame in the combination step.

9. The image processing method according to claim 8, further comprising:

a determination step of determining, as a feature derived from image analysis of one frame included in the selected part, a theme of the one frame.

10. The image processing method according to claim 9, further comprising:

a search step of searching, in a table in which each value of a theme and a character string are associated with each other, for a character string corresponding to the theme determined in the determination step, wherein, in a case where a voice extracted in the extraction step is not recognizable as a word or a sentence in the recognition step, a character string searched at the search step is used in the combination step.

11. The image processing method according to claim 9, wherein any one of a plurality of themes including a wedding and a journey is determined to be a theme of the one frame.

12. The image processing method according to claim 8, wherein in the selection step, the frame is selected, and the part of the moving image based on the selected frame is selected, and wherein in the extraction step, the voice based on the selected part is extracted and in the combination step, the character string is combined with the selected frame.

13. The image processing method according to claim 12, wherein in the selection step, a part of the moving image corresponding to the predetermined time before or after the selected frame is selected.

14. The image processing method according to claim 8, wherein the mixed voice is (a) a voice mixed with an environmental sound or (b) voices of a plurality of speakers.

15. A non-transitory computer-readable storage medium storing a program for causing a computer to perform an image processing method comprising:

a selection step of selecting, from a moving image including a plurality of frames, a part of the moving image;

an extraction step of extracting a voice during a predetermined time corresponding to the selected part in the moving image;

a recognition step of recognizing a voice extracted in the extraction step as a word or a sentence, wherein (i) in a case where a voice extracted in the extraction step is a mixed voice, the voice extracted at the extraction step is not recognizable as a word or a sentence in the recognition step, and (ii) in a case where a voice extracted in the extraction step is not a mixed voice, the voice extracted at the extraction step is recognizable as a word or a sentence in the recognition step;

a conversion step of converting a word or a sentence recognized at the recognition step into a character string; and a combination step of combining a character string with the part of the moving image selected at the selection step or a frame among frames corresponding to the part, wherein, in accordance with a voice extracted in the extraction step being not recognizable as a word or a sentence in the recognition step, a character string that is different from a character string obtained by converting a word or a sentence recognized in the recognition step and is specified based on a feature derived from image analysis of one frame included in the selected part is combined with the selected part or the frame in the combination step, and wherein, in accordance with a voice extracted at the extraction step being not recognizable as a word or a sentence in the recognition step, a character string that is obtained by converting a word or a sentence recognized in the recognition step and is specified not based on a feature derived from image analysis of one frame included in the selected part is combined with the selected part or the frame in the combination step.

16. The medium according to claim 15, wherein the image processing method further comprises a determination step of determining, as a feature derived from image analysis of one frame included in the selected part, a theme of the one frame.

17. The medium according to claim 16, wherein the image processing method further comprises a search step of searching, in a table in which each value of a theme and a character string are associated with each other, for a character string corresponding to the theme determined in the determination step, wherein, in a case where a voice extracted in the extraction step is not recognizable as a word or a sentence in the recognition step, a character string searched at the search step is used in the combination step.

18. The medium according to claim 16, wherein any one of a plurality of themes including a wedding and a journey is determined to be a theme of the one frame.

19. The medium according to claim 15, wherein in the selection step, the frame is selected, and the part of the moving image based on the selected frame is selected, and wherein in the extraction step, the voice based on the selected part is extracted and at the combination step, the character string is combined with the selected frame.

20. The medium according to claim 19, wherein in the selection step, a part of the moving image corresponding to the predetermined time before or after the selected frame is selected.

21. The medium according to claim 15, wherein the mixed voice is (a) a voice mixed with an environmental sound or (b) voices of a plurality of speakers.

* * * * *